United States Patent
Nagata et al.

(10) Patent No.: US 8,317,386 B2
(45) Date of Patent: Nov. 27, 2012

(54) LASER-LIT PLANAR ILLUMINATION DEVICE AND LCD USING SUCH DEVICE

(75) Inventors: Takayuki Nagata, Osaka (JP); Shinichi Kadowaki, Hyogo (JP); Kazuhisa Yamamoto, Osaka (JP); Tatsuo Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 980 days.

(21) Appl. No.: 12/374,939

(22) PCT Filed: Jul. 23, 2007

(86) PCT No.: PCT/JP2007/064458
§ 371 (c)(1), (2), (4) Date: Jan. 23, 2009

(87) PCT Pub. No.: WO2008/013146
PCT Pub. Date: Jan. 31, 2008

(65) Prior Publication Data
US 2009/0190070 A1    Jul. 30, 2009

(30) Foreign Application Priority Data
Jul. 24, 2006  (JP) .................. 2006-200316

(51) Int. Cl.
*F21V 7/04* (2006.01)
*G02B 27/10* (2006.01)

(52) U.S. Cl. ...... 362/611; 362/259; 362/607; 359/216.1

(58) Field of Classification Search ............... 362/97.1, 362/97.3, 234, 242, 253, 259, 268, 311.12, 362/331, 332, 600, 606–608, 615, 617–619, 362/621, 628; 359/216.1, 218.1, 219.1, 629, 359/1, 634, 636
See application file for complete search history.

(56) References Cited

U.S. PATENT DOCUMENTS
4,185,891 A * 1/1980 Kaestner ................. 372/9
5,700,078 A * 12/1997 Fohl et al. ............... 362/553
(Continued)

FOREIGN PATENT DOCUMENTS
JP     1-241590     9/1989
(Continued)

OTHER PUBLICATIONS
International Search Report issued Oct. 23, 2007 in the International (PCT) Application No. PCT/JP2007/064458.

*Primary Examiner* — Ismael Negron
(74) *Attorney, Agent, or Firm* — Wenderoth, Lind & Ponack, L.L.P.

(57) ABSTRACT

A planar illumination device includes an optical element outputting a diffusing light from a laser light source into an incident edge surface of a light guide plate. The optical element provides an output substantially parallel to a thickness direction of the light guide plate. A light deflecting unit, including a plurality of deflectors, is provided on a principal surface of the light guide plate for deflecting incident laser light towards an output surface of the light guide. The light deflecting unit is arranged such that a degree of deflection of the light incident on the light guide plate differs according to positions in the light guide plate, to make an amount of light outputted from the output surface uniform across such output surface.

18 Claims, 9 Drawing Sheets

U.S. PATENT DOCUMENTS

| | | | |
|---|---|---|---|
| 6,522,373 B1* | 2/2003 | Hira et al. | 362/603 |
| 6,712,481 B2* | 3/2004 | Parker et al. | 362/619 |
| 6,714,351 B2* | 3/2004 | Giordano et al. | 359/489.07 |
| 6,819,372 B2* | 11/2004 | Kashima | 349/65 |
| 6,886,954 B2* | 5/2005 | Williams et al. | 362/19 |
| 7,128,457 B2* | 10/2006 | Hashimoto | 362/618 |
| 7,277,229 B2* | 10/2007 | Kato | 359/618 |
| 7,484,875 B2* | 2/2009 | Kim et al. | 362/612 |
| 7,597,467 B2* | 10/2009 | Itaya | 362/601 |
| 7,688,343 B2* | 3/2010 | Sunada | 347/262 |
| 7,690,831 B2* | 4/2010 | Mori et al. | 362/621 |
| 7,817,212 B2* | 10/2010 | Lee et al. | 348/744 |
| 7,821,678 B2* | 10/2010 | Tomita | 358/474 |
| 8,081,365 B2* | 12/2011 | Kato et al. | 359/216.1 |
| 2003/0128543 A1* | 7/2003 | Rekow | 362/259 |
| 2005/0238071 A1* | 10/2005 | Oka | 372/21 |
| 2006/0146573 A1 | 7/2006 | Iwauchi et al. | |
| 2006/0233489 A1* | 10/2006 | Liao | 385/31 |
| 2007/0139968 A1* | 6/2007 | Chang | 362/621 |

FOREIGN PATENT DOCUMENTS

| | | |
|---|---|---|
| JP | 6-130365 | 5/1994 |
| JP | 6-230380 | 8/1994 |
| JP | 7-270617 | 10/1995 |
| JP | 8-327807 | 12/1996 |
| JP | 9-307174 | 11/1997 |
| JP | 9-326205 | 12/1997 |
| JP | 2005-24866 | 1/2005 |
| JP | 2006-023466 | 1/2006 |
| JP | 2006-073202 | 3/2006 |
| WO | 2004/055429 | 7/2004 |

* cited by examiner

LASER-LIT PLANAR ILLUMINATION DEVICE AND LCD USING SUCH DEVICE

FIELD OF TECHNOLOGY

The present invention relates to a planar illumination device using laser light as a light source and a liquid crystal display device adopting the same.

DESCRIPTION OF THE BACKGROUND ART

Conventionally, backlight illumination devices using a cold cathode fluorescent tube have been widely used in liquid crystal display devices with liquid crystal display panels. In recent years, attention has been focused on backlight illumination using three color light emitting diodes (LED devices) of red, green and blue lights for the reproduction of more clear and natural color tones, and the development thereof has been vigorously promoted.

A planar illumination device of the lateral light source type so-called edge light type is used as a backlight illumination device with a relatively small size, wherein light emitted from a light source is incident on a side surface (incident surface) of a light guide plate and light is emitted from one principal surface (light output surface) of the light guide plate for illumination.

The light guide plate adopted in this method uses a principal surface at a side opposite to the light output surface as a light reflecting surface and a dimming pattern is applied to either one of the principal surfaces of the light guide plate to make the output light uniform.

Known dimming patterns include the one formed by providing a plurality of random reflection areas on a reflecting surface of a transparent light guide plate by printing or the like in such a manner as to increase the density of the random reflection areas or a degree of scattering of the random reflection areas with distance from a light source (as disclosed in for example, Patent Documents 1, 2) and the one formed by providing recesses or projections in or on the reflecting surface of the light guide plate in such a manner as to successively increase the depths or the heights thereof with distance from the light source (as disclosed in for example, Patent Document 3).

A direct illumination device wherein cathode fluorescent tubes or LED devices are arranged in a planar manner is used for backlight illumination requiring a large size and a high luminance.

An increasing demand can be expected in the feature for liquid crystal display devices with thin and large screens, for use in for example wall mounted TVs, however, such direct illumination devices have such drawback in that it is more difficult to realize a thinner liquid crystal display device as compared to the case of edge light type illumination devices, and are less suited for thinner liquid crystal display devices. On the other hand, for the edge light type illumination devices, although it is difficult to ensure a sufficient luminance when adopting larger screens, it is possible to place them into practical applications by increasing the luminance of light sources.

In response, edge light type planar illumination devices using laser light sources which have higher luminance than LED devices and which are suited for higher outputs have been studied to realize thin liquid crystal display devices with large screens.

For the edge light type planar illumination device adopting laser light sources may be arranged, for example, as shown in FIGS. 9A and 9B. FIGS. 9A and 9B are a plan view and a side view schematically showing structures of a conventional planar illumination device adopting laser light sources.

In FIGS. 9A and 9B, diffusing light emitted from a high-output laser light source 10 is incident on a light guide plate 12 after being formed into luminous flux substantially parallel at least in the thickness-wise direction of the light guide plate 12 by a cylindrical lens 11.

The foregoing structure, wherein the light is incident on the light guide plate 12 from a direction substantially parallel to the thickness-wise direction of the light guide plate 12, has the following problem.

The laser light, incident on the light guide plate 12 from the direction substantially parallel to the light guide plate 12, propagates in vicinity of the light guide plate 12 as the substantially parallel light with its directivity. Thus, the amount of the light polarized by reflection or scattering is smallest at the light incident surface side of the light guide plate 12. On the other hand, the density of a dimming pattern 12a of the conventional light guide plate 12 is set to be sparse at the light incident surface side of the laser light from the laser light source 10 and to increase with distance from the laser light source 10. Accordingly, in the case of applying the dimming pattern 12a of the conventional light guide plate 12 to the laser light source 10, an effect of polarizing the light by reflection or scattering is further reduced in vicinity of the light incident surface of the light guide plate 12 and most of the luminous flux is totally reflected in vicinity of the light incident surface. The totally reflected luminous flux propagates to the inside of the light guide plate 12 without being emitted from the light guide plate 12. As a result, the amount of the output light in vicinity of the light incident surface decreases to make the luminance of the emitted light from the light guide plate 12 nonuniform.

Patent Document 1:
Japanese Unexamined Patent Publication No. H01-241590
Patent Document 2
Japanese Unexamined Patent Publication No. H06-130365
Patent Document 3:
Japanese Unexamined Patent Publication No. H06-230380

DISCLOSURE OF THE INVENTION

An object of the present invention is to realize a planar illumination device, which provides a uniform luminance over a large area, adopting a laser light source which provides a wide color reproduction range and a thin and large screen, and also to realize a liquid crystal display device adopting such planar illumination device.

A planar illumination device according to one aspect of the present invention includes a laser light source; a light guide plate for guiding light entered through an end surface to be outputted from a first principal surface; an optical element which forms diffusing light outputted from the laser light source into a substantially parallel light in a thickness-wise direction of the light guide plate and which outputs the resulting parallel light to the end surface of the light guide plate; and a first light deflecting unit for deflecting a propagation direction in the light guide plate of the light incident thereon, wherein the first light deflecting unit is arranged such that a degree of deflection of the light incident on the light guide plate differs according to positions in the light guide plate, to make an amount of light outputted from the first principal surface uniform in the first principal surface.

In the above planar illumination device, the amount of light emitted from the first principal surface of the light guide plate can be made uniform in the first principal surface since the degree of deflection of the light incident on the light guide plate by the first light deflecting unit is changed depending on the position in the light guide plate. Therefore, a planar illumination device having a uniform luminance over a large area can be realized.

BRIEF DESCRIPTION OF THE DRAWINGS

FIGS. 7A to 7C are diagrams showing a light guide plate used in a planar illumination device according to the seventh embodiment of the present invention, wherein FIG. 7A is a side view schematically showing the structures of the light guide plate, FIG. 7B is a diagram showing a projection formed on a reflecting surface of the light guide plate and an incident angle of laser light incident on the projection and FIG. 7C is a diagram showing the projection formed on the reflecting surface of the light guide plate and another incident angle of laser light incident on the projection.

BEST MODES FOR EMBODYING THE INVENTION

Figure 1A:
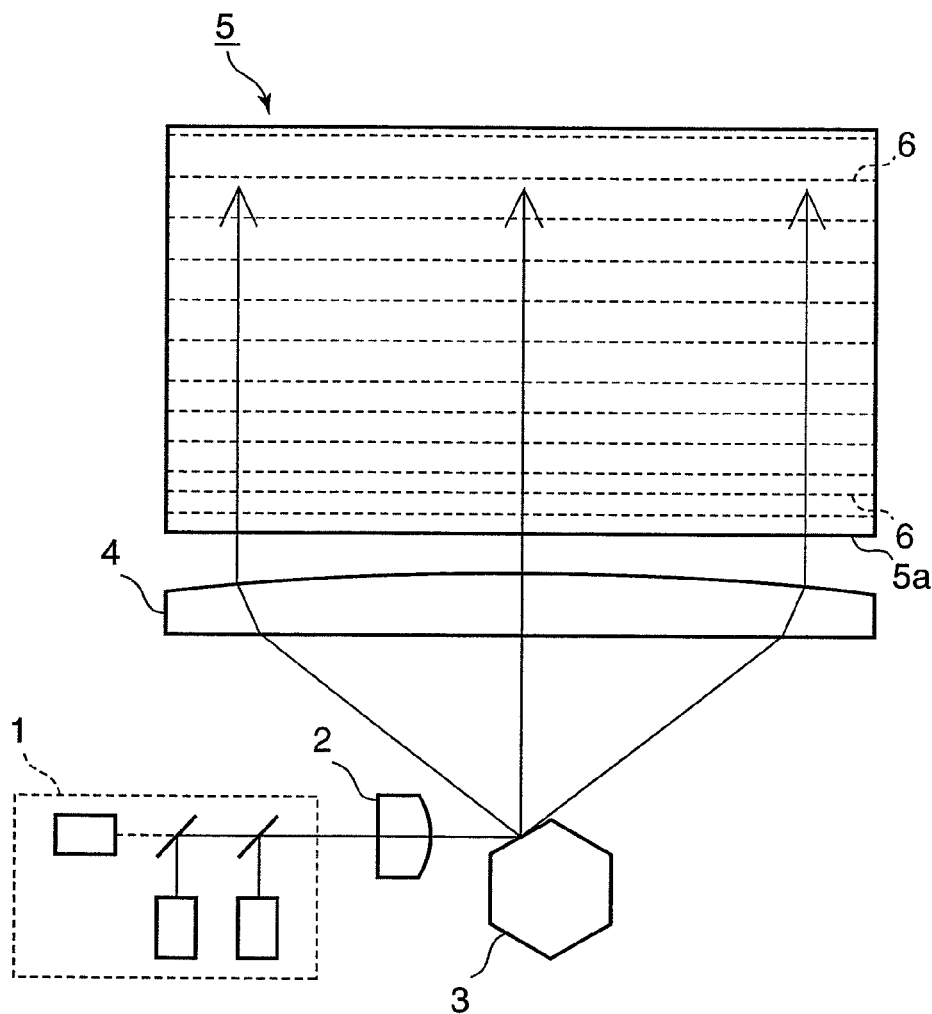
FIGS. 1A and 1B are a plan view and a side view schematically showing the structures of a planar illumination device according to the first embodiment of the present invention.

Hereinafter, embodiments of the present invention are described with reference to the drawings. It should be noted here that the members having the same structures and the functions are designated by the same reference numerals, and explanations thereof may be omitted for convenience for explanations.

First Embodiment

Figure 1B:
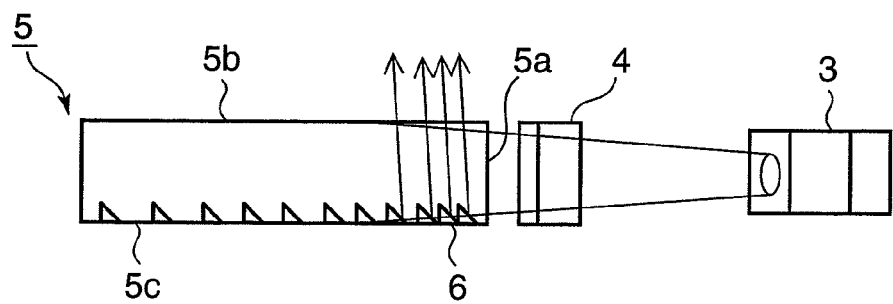

FIGS. 1A and 1B are a plan view and a side view schematically showing the structures of a planar illumination device according to the first embodiment of the present invention.

In FIGS. 1A and 1B, the planar illumination device of the present embodiment is provided with a light source unit 1 which combines lights from three laser light sources for emitting lights of, i.e., red light, green light and blue light, and which emits light as combined; a cylindrical lens 2 which forms the light emitted from the light source unit 1 into a substantially parallel light, a rotary polygon mirror 3 which polarizes and scans the light emitted from the light source unit 1, a cylindrical lens 4 arranged so as to form a focal point on a reflecting surface of the rotary polygon mirror 3, and a light guide plate 5 with a light incident surface (one end surface) 5a of the light entered from the cylindrical lens 4 and a light output surface (one principal surface) 5b. Although the rotary polygon mirror 3 is used as means for scanning the light emitted from the light source unit 1 with respect to the light guide plate 5 in the present embodiment, the light emitted from the light source unit 1 may be diffracted, scattered or diverged with respective to the light guide plate 5 by known technology such as a diffraction element, a light guide bar or a scattering element in replace of the rotary polygon mirror 3.

In the present embodiment, a plurality of projections 6 are formed on a reflection surface 5c of the light guide plate 5 in lines parallel to the light incident surface 5a. These projections are provided for polarizing the light incident on the light guide plate 5 by reflection and directing it toward the light output surface 5b. The projections 6 are formed over the entire reflecting surface 5c at different densities, i.e., at higher density in vicinity of the light incident surface 5a than that of other portions as shown in FIGS. 1A and 1B. In FIG. 1A, the projections 6 are shown by dotted lines for simplification of the drawing. The projections 6 are adopted as one example of the deflectors which change the propagation direction of the laser light emitted from the light source unit 1 using an optical phenomenon of at least one of reflection, scattering, refraction and diffraction. Here, as described above, the propagation direction of the laser light is changed by the reflection from the projections 6. These projections 6 are generally formed by forming grooves in the reflecting surface 5c of the light guide plate 5 by means of laser processing, or by forming grooves integrally with the light guide plate 5 when molding the light guide plate 5. However, it is needless to mention that the present embodiment is not intended to be limited to the foregoing structure. The deflectors can be realized also by forming scattering particles made of thermosetting resin or thermoplastic resin in the light guide plate 5 or forming bubbles or the like in the light guide plate 5. Although the projections 6 are formed at higher density in vicinity of the light incident surface 5a, the present embodiment is not intended to be limited to this structure, and the structure wherein the sizes of the projections 6, i.e., the depths of the grooves are increased in vicinity of the light incident surface 5a may be adopted. It is needless to mention that not only the depths of the grooves, but also the sizes of the three-dimensional shapes of the deflectors may be increased. Further, instead of the sizes of the three-dimensional shapes of the deflectors, the deflectors may be formed such that a degree of scattering or diffraction efficiency of the deflectors increases to the light incident surface 5a. With this structure, it is possible to increase the degree of scattering the laser light in vicinity of the light incident surface 5a.

In the planar illumination device according to the present embodiment, diffusing light emitted form the light source unit 1 is formed into substantially parallel luminous flux by the cylindrical lens 2, polarized and scanned by the rotary polygon mirror 3, deflected so that an incident angle on the light guide plate 5 is fixed and then entered to the light guide plate 5 by the cylindrical lens 4. In other words, the light from the cylindrical lens 4 is incident substantially parallel to a thickness-wise direction of the light guide plate 5. The light entered through the light incident surface 5a is reflected and deflected by the projections 6 formed on the reflecting surface 5c of the light guide plate 5 to be outputted from the light output surface 5b at an angle equal to or smaller than the critical angle of the light guide plate 5.

Figure 9A:
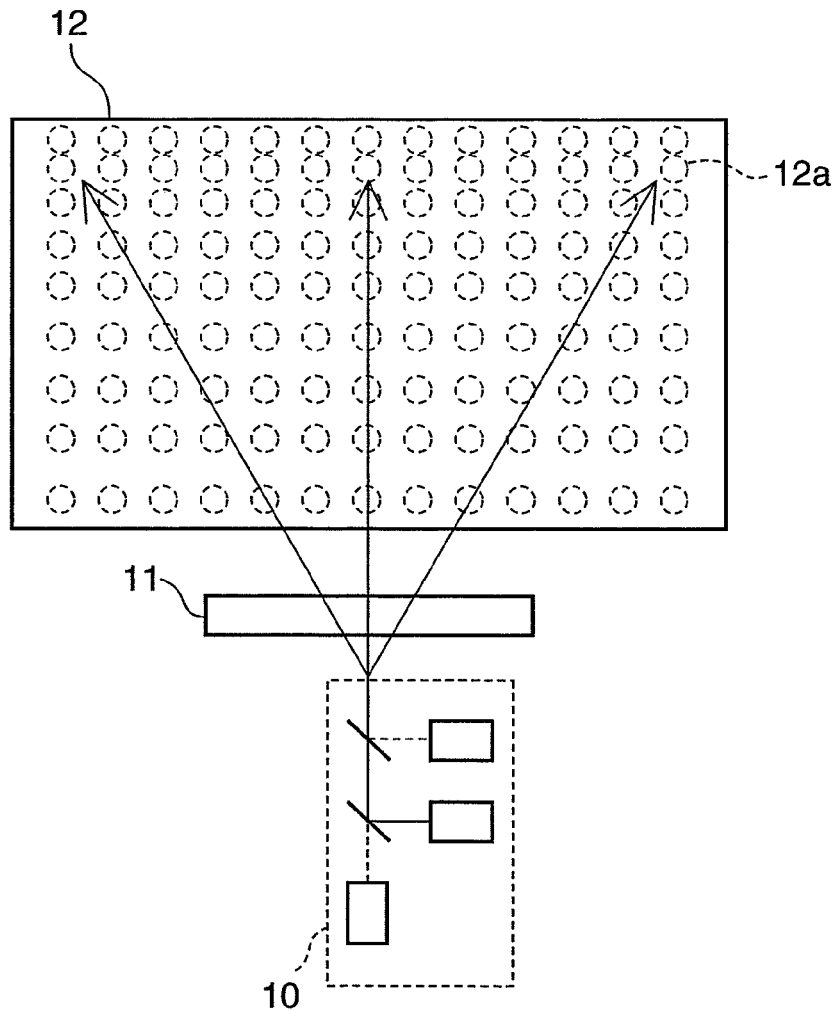
FIGS. 9A and 9B are a plan view and a side view schematically showing the structures of a conventional planar illumination device using laser light sources.
Figure 9B:
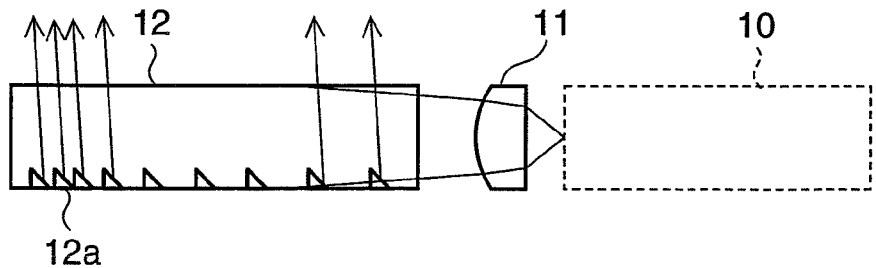

Here, if the density of deflectors such as the projections increases with distance from the light incident surface as in the light guide plate 12 of FIGS. 9A and 9B, the amount of light reflected and deflected in vicinity of the light incident surface would be small, and most of light incident in the form of substantially parallel luminous flux repeats total reflection in the light guide plate 12 and propagate in the inside of the light guide plate 12. Thus, it would be dark in vicinity of the light incident surface of the light guide plate 12 since light would not be emitted.

On the other hand, since the projections 6 are arranged at higher density in vicinity of the light incident end surface 5*a* of the light guide plate 5 than that of other portions, it is possible to provide uniform luminance of the entire light guide plate 5 by increasing the luminance of the light emitted from the light output surface 5*b* in vicinity of the light incident surface 5*a*.

According to the present embodiment, the light emitted from the light source unit 1 provided with the laser light sources whose polarization directions are aligned is incident on the light guide plate 5 at the same incident angle, and an angle of reflection from the projections arranged in lines parallel to the light incident surface 5*a* is not disturbed. With this structure, the output light from the light guide plate 5 with a high extinction ratio can be obtained, which in turn improves the transmittance at the polarizing plate of the liquid crystal display panel.

As described, according to the planar illumination device of the present embodiment, it is possible to realize a high-quality liquid crystal display device with a thin and large screen and desirable color reproducibility by using laser light sources with high luminous efficiency and desirable color purity and also possible to provide uniform luminance over the large area by forming the dimming pattern of the light guide plate in conformity with the structure which permits laser light to be incident in the form of substantially parallel light. Since the polarization of the laser light incident on the light guide plate is maintained by this dimming pattern and the light with aligned polarization is emitted from the light guide plate, it is possible to increase the transmittance of the liquid crystal display panel and to realize a liquid crystal display device with low power consumption.

In the foregoing preferred embodiment, the projections 6 provided on the reflecting surface 5*c* of the light guide plate 5 are adopted for the deflectors. However, the present invention is not intended to be limited to this structure, and, for example, convexo-concave portions formed by forming grooves or the like in the reflecting surface 5*c* or scattering elements provided on the reflecting surface 5*c* formed by printing or the like may be adopted in replace of the projections 6. The foregoing structure wherein the convexo-concave portions are formed on the light output surface 5*b* or the scattering elements are provided in the light guide plate 5 in replace of the projections 6 formed on the reflecting surface 5*c* or the like, offer the same effects as achieved from the structure adopting the projections 6.

In the above preferred embodiment, the incident angles on the light guide plate 5 are aligned using the cylindrical lens 4, and the polarized lights of the output lights from the light guide plate 5 are aligned by reflecting the lights from the projections 6 arranged in lines. However, the present embodiment is not intended to be limited to the foregoing structure, and it may be arranged, for example, such that the reflected lights from the rotary polygon mirror 3 are directly incident on the light guide plate 5 without using the cylindrical lens 4. In this case, the lights are incident on the light guide plate 5 in a radial fashion, but the polarized lights of the lights emitted from the light output surface 5*b* can be aligned by arranging the projections 6 in parabolas in conformity with the radial lights.

In the above preferred embodiment, the projections 6 are arranged at higher densities in vicinity of the light incident surface 5*a*. However, the present embodiment is not intended to be limited to the foregoing structure, and it may be arranged such that the projections 6 are formed at higher density both in vicinity of the light incident surface 5*a* and the other end surface in the case of adopting a relatively large size light guide plate with low transmittance from the light incident surface 5*a* to the other end surface of the light guide plate 5.

In the above preferred embodiment, the laser light is scanned by the rotary polygon mirror 3 in consideration of the problems associated with the structure, i.e., the anti-speckle solution and the uniformity of laser light in a spreading direction (the direction orthogonal to the propagation direction of the laser light). However, the present embodiment is not intended to be limited to the foregoing structure, and it may be arranged such that a luminous flux is incident on the light guide plate 5 after being spread in the direction parallel to the light output surface 5*b* using a cylindrical lens or the like.

In the above preferred embodiment, one light source unit 1 is provided. However, the present embodiment is not intended to be limited to the foregoing structure, and it may be arranged for example such that a plurality of light source units are provided, and/or laser lights are incident on the plurality of light incident surfaces of the light guide plate 5.

In the above preferred embodiment, it is arranged such that the light is incident on the light guide plate 5 at the same incident angle using the cylindrical lens 4. However, the present embodiment is not intended to be limited to the foregoing structure, and it may be arranged for example such that, a Fresnel lens having a cylindrical lens effect may be formed on the light incident surface 5*a* of the light guide plate 5. In this case, since the cylindrical lens 4 can be omitted, it is possible to reduce an overall size of the planar illumination device.

Second Embodiment

Figure 2A:
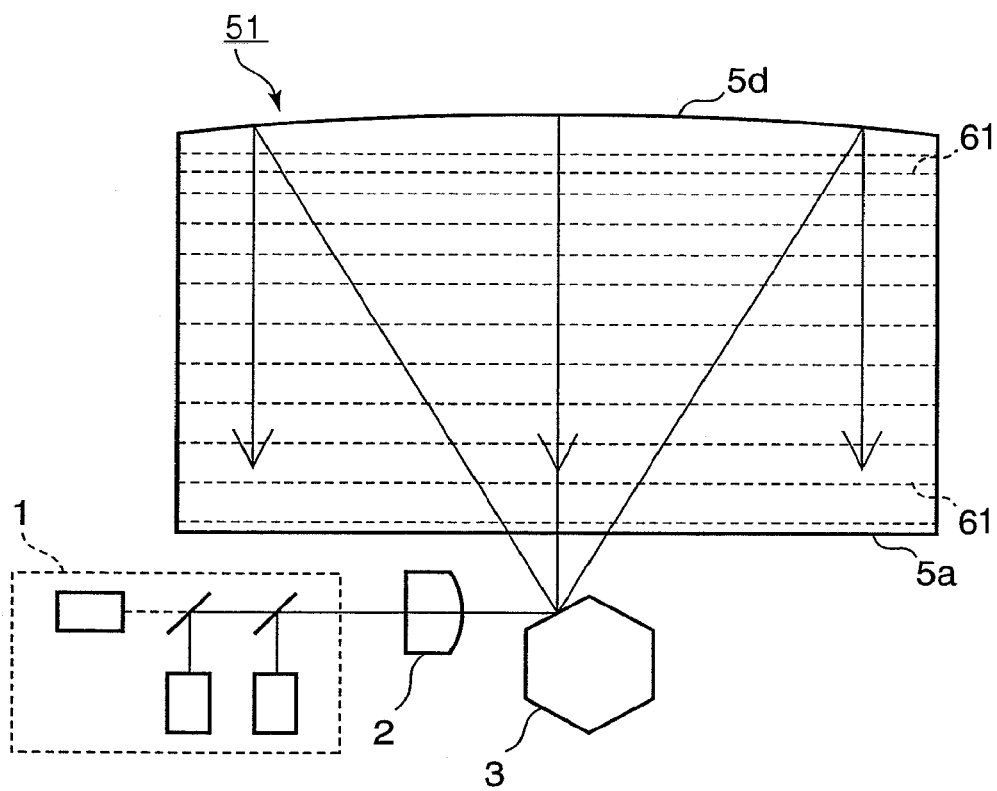
FIGS. 2A and 2B are a plan view and a side view schematically showing the structures of a planar illumination device according to the second embodiment of the present invention.
Figure 2B:
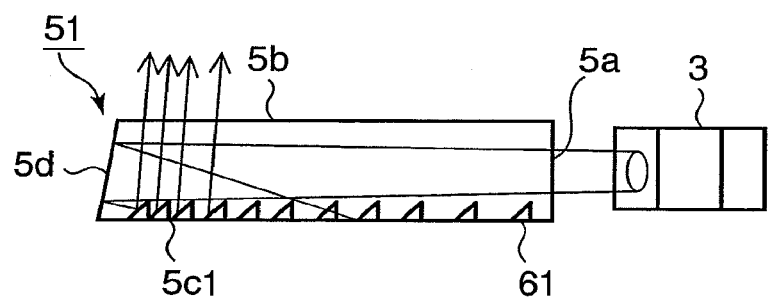

Next, the second embodiment of the present invention is described. In the above first embodiment, lights polarized and scanned by the rotary polygon mirror are incident on the light guide plate after having the incident angles thereof aligned by the cylindrical lens. On the other hand, in the present embodiment, reflected lights by a rotary polygon mirror are directly incident on a light guide plate. With the structure of the present embodiment, since the cylindrical lens 4 can be omitted, it is possible to reduce an overall size of the planar illumination device. FIGS. 2A and 2B are a plan view and a side view schematically showing the structures of a planar illumination device according to the second embodiment of the present invention.

In the planar illumination device according to the present embodiment, as shown in FIGS. 2A and 2B, light from a cylindrical lens 2 is polarized and scanned by a rotary polygon mirror 3 in a reciprocation path of the light guide plate 51, i.e., the reciprocation path from an incident surface 5*a* to another end surface 5*d*. Polarized and scanned lights are then reflected by the other end surface 5*d* such that propagation directions thereof in the light guide plate 51 are aligned. The lights incident on the light guide plate 51 from the rotary polygon mirror 3 propagate in the light guide plate 51 in the reciprocation path from the light incident surface 5*a* to the other end surface 5*d* without being reflected by the projections 61, and the lights are then reflected by the other end surface 5*d* and are guided to a reflecting surface 5*c*1 of the light guide plate 51 in a return path.

The end surface 5d of the light guide plate 51 according to the present embodiment has a lens function of converging or diverging the lights polarized and scanned by the rotary polygon mirror 3 in a direction orthogonal to a thickness-wise direction of the light guide plate 51 and reflects the incident lights toward the reflecting surface 5c1 while aligning the propagation direction of the incident light by its lens function.

According to the present embodiment, it is possible to reduce an overall size of the planar illumination device without reducing the thickness of the light guide plate 51.

Third Embodiment

Figure 3A:
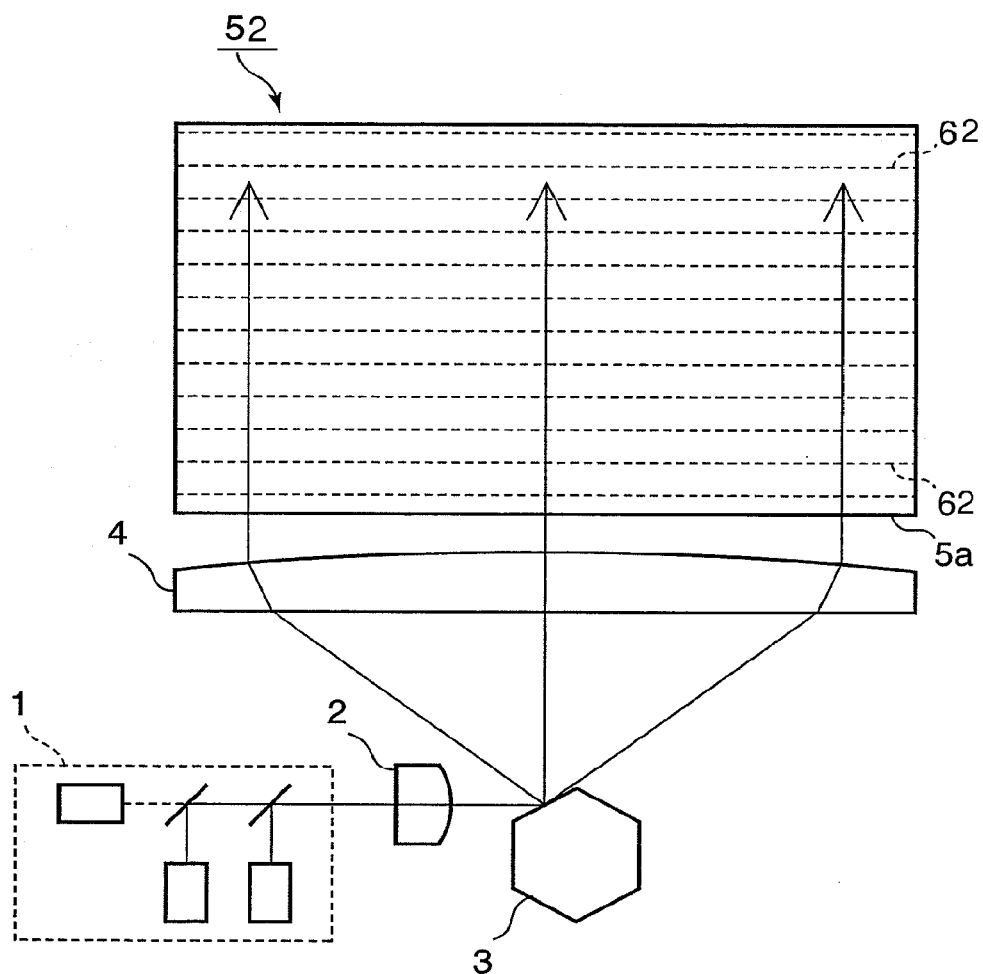
FIGS. 3A and 3B are a plan view and a side view schematically showing the structures of a planar illumination device according to the third embodiment of the present invention.
Figure 3B:
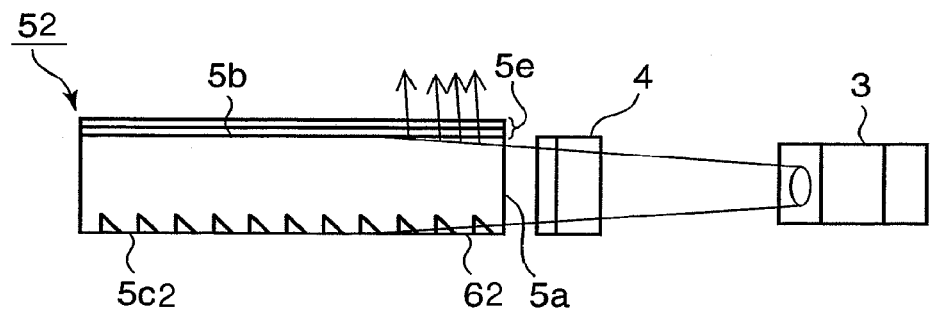

Next, the third embodiment of the present invention is described. In the above first and second embodiments, the deflectors such as the projections are arranged so as to reduce variations in luminance of lights outputted from the light output surface of the light guide plate. In contrast, in the present embodiment, in replace of the foregoing structure with the characteristic arrangements of the deflectors (projections), the transmittance of the lights outputted from the light output surface of the light guide plate are adjusted so as to reduce variations in luminance of lights outputted from the light output surface of the light guide plate. FIGS. 3A and 3B are a plan view and a side view schematically showing the structure of a planar illumination device according to the third embodiment of the present invention.

As shown in FIGS. 3A and 3B, the planar illumination device according to the present embodiment differs from the above first and second embodiments in that projections 6 projections 62 are uniformly arranged on the reflecting surface 5c2. On the other hand, on the light output surface 5b, a translucent film 5e is formed which is, for example, made up of multiple layers of a high refractive index material and a low refractive index material. The translucent film 5e has such a transmittance distribution that the transmittance thereof differs according to positions in the light output surface 5b. Specifically, the translucent film 5e has such the transmittance distribution that the transmittance on the light output surface 5b is high in vicinity of the light incident surface 5a, while the transmittance on the light output surface 5b is lower toward the other end surface facing the light incident surface 5a.

In the present embodiment, the projections 62 are uniformly provided in the reflecting surface 5c2; however, the projections 62 may be provided at higher density in vicinity of the light incident surface 5a than that of other portions as in the case of the first embodiment. With this structure, it is possible to still improve the luminance of the light outputted from the light output surface 5b in vicinity of the light incident surface 5a, thereby realizing a still more uniform luminance of the light guide plate 52.

According to the present embodiment, uniform luminance can be realized over the entire surface of the light guide plate 52 as achieved from the structures of the first and second embodiments.

The translucent film of the present embodiment may be formed such that the transmittance distribution changes according to wavelengths. With this structure of the translucent film, it is possible to adjust the luminance for each color, thereby reducing non-uniform color.

Fourth Embodiment

Figure 4A:
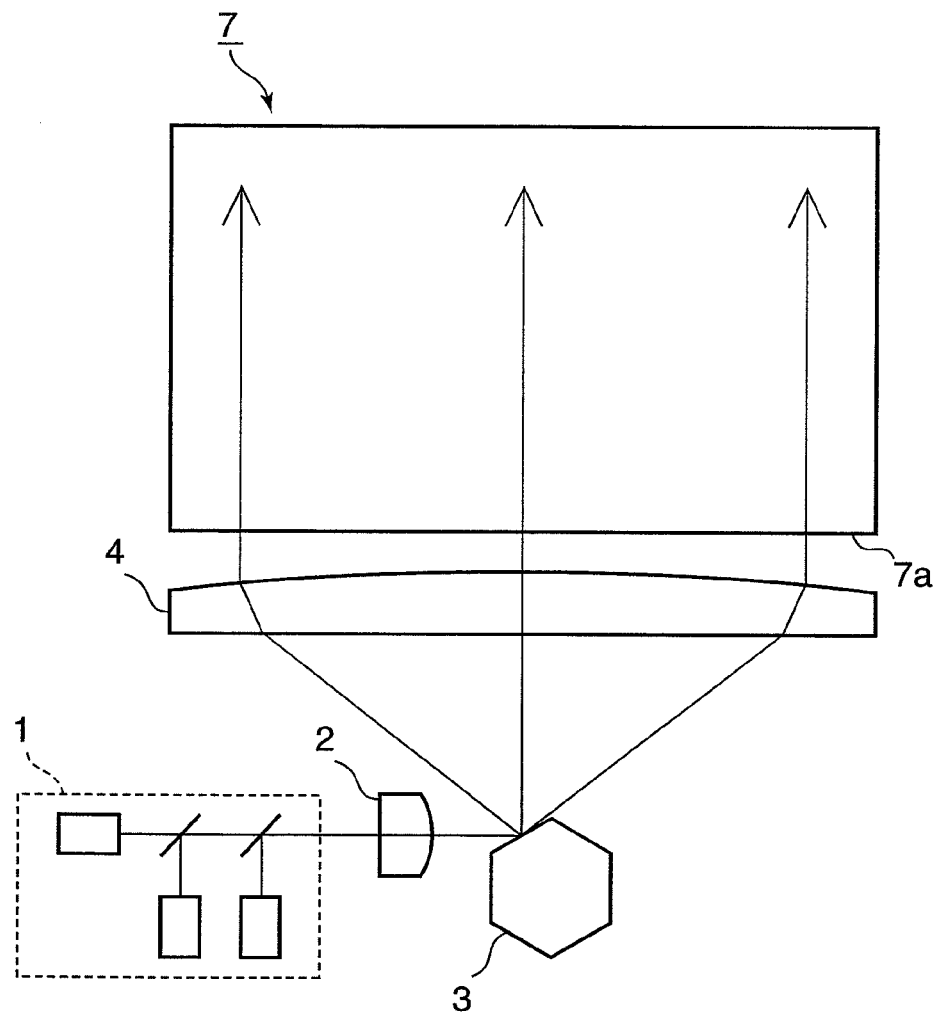
FIGS. 4A and 4B are a plan view and a side view schematically showing the structures of a planar illumination device according to the fourth embodiment of the present invention.
Figure 4B:
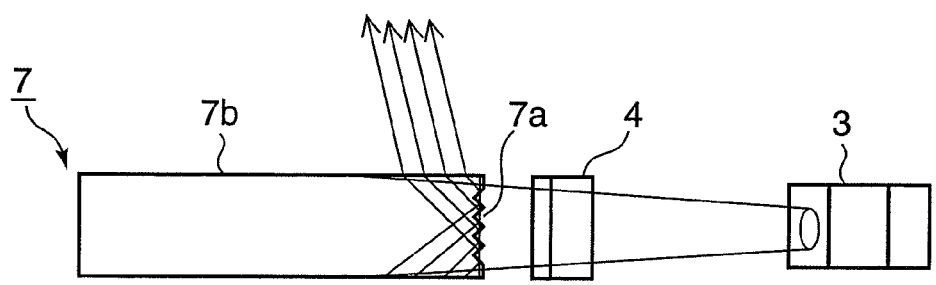

Next, the fourth embodiment of the present invention is described. In the above first and second embodiments, the deflectors such as the projections are arranged in the light guide plate at non-uniform distribution so as to reduce variations in luminance of lights outputted from the light output surface of the light guide plate. In contrast, in the present embodiment, deflectors are arranged in the light incident surface of the light guide plate in replace of the foregoing structure wherein the deflectors (projections) on the light guide plate at different distributions, to achieve the same effects as achieved from the structures of the first and second embodiments. FIGS. 4A and 4B are a plan view and a side view schematically showing the structures of a planar illumination device according to the fourth embodiment of the present invention. The present embodiment differs from the first embodiment only in a light guide plate 7, and the other elements are not described since being the same as those of the first embodiment. It should be noted that the arrangement of the deflectors such as projections, which are uniformly arranged in the light guide plate, are not shown in FIGS. 4A and 4B for simplicity of the drawing.

As shown in FIG. 4B, the light incident surface 7a of the light guide plate 7 according to the present embodiment is arranged so has to have convexo-concave portions for diffracting, refracting or scattering light incident on the light guide plate 7 in a thickness-wise direction. The convexo-concave portions are formed as one example of deflectors, which change the propagation direction of the laser light emitted from a light source unit 1 and incident on the light guide plate 7 using an optical phenomenon of at least one of reflection, scattering, refraction and diffraction.

According to the planar illumination device of the present embodiment, diffusing light emitted from the light source unit 1 is formed into substantially parallel flux by a cylindrical lens 2. The resulting substantially parallel flux is then polarized and scanned by a rotary polygon mirror 3, and is further polarized by a cylindrical lens 4 so that the light can be incident on the light guide plate 7 at the same incident angle to be entered through the light incident surface 7a of the light guide plate 7. The light incident on the light guide plate 7 is deflected in the thickness-wise direction of the light guide plate 7 by the convexo-concave portions of the light incident surface 7a when passing through the light incident surface 7a to be entered in the light guide plate 7. The light incident on the light guide plate 7 is deflected by the deflectors while being repeatedly reflected between one principal surface (light output surface) 7b and the other principal surface of the light guide plate 7, and is outputted little by little from the light output surface 7b.

With this structure, since the light incident on the light guide plate 7 is deflected in the thickness-wise direction of the light guide plate 7, a sufficient amount of light is deflected even at positions in vicinity of the light incident surface 7a, and it is therefore possible to improve the luminance of the light outputted from the light output surface 7b in vicinity of the light incident surface 7a. Therefore, as compared with the case where luminous flux parallel to the thickness-wise direction of the light guide plate 7 is incident, a sufficient luminance can be obtained even in vicinity of the light incident surface 7a and the luminance of the entire light guide plate 7 can be made uniform.

According to the structure of the present embodiment wherein the incident light is deflected only in the thickness-wise direction of the light guide plate 7 on the light incident surface 7a, the light incident on the light incident surface 7a can pass through the light incident surface 7a without changing the polarization direction. As a result, output light with a high extinction ratio can be obtained, and the transmittance of the liquid crystal display panel can be increased.

The foregoing structure of the present embodiment provides a uniform luminance over a large area. Moreover, the transmittance of the liquid crystal display panel can be improved. As a result, a liquid crystal display device with low power consumption can be realized.

The convexo-concave portions of the light incident surface 7a of the present embodiment can be a surface with a cylindrical lens effect having a curvature in the thickness-wise direction of the light guide plate 7. Incidentally, efficiency on the light incident surface 7a can be improved by forming the convexo-concave portions of the light incident surface 7a into such a sawtooth shape with one of inclination angles is set to be a Brewster angle and forming incident polarized light into P-polarized light.

In the above preferred embodiment, the convexo-concave portions are formed on the light incident surface 7a of the light guide plate 7. However, the present invention is not intended to be limited to this structure, and for example, a prism array or a diffraction grating may be provided directly before the light incident surface 7a. With this structure, the prism array or diffraction grating may be formed at equal intervals or different intervals. Alternatively, a cylindrical lens having a curvature in the thickness-wise direction of the light guide plate 7 may be provided directly before the light incident surface 7a so as to condense the light in vicinity of the light incident surface 7a. With this structure, the light as condensed in vicinity of the light incident surface 7a is deflected in the light guide plate 7. It is therefore possible to achieve the same effects as achieved from the structure wherein the light incident surface 7a of the light guide plate 7 has the convexo-concave portions.

In the foregoing preferred embodiment, the characteristic arrangement of the projections provided at different densities of the first embodiment is not adopted. However, it is still possible to provide still more uniform luminance by additionally using the dimming pattern using the projections 6.

Fifth Embodiment

Figure 5A:
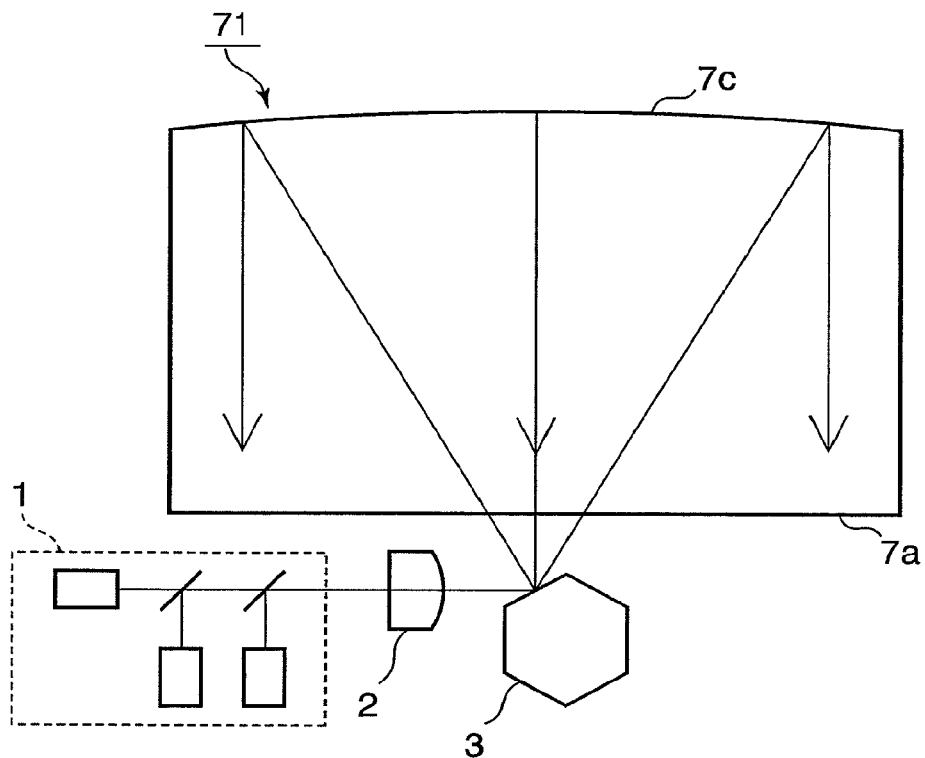
FIGS. 5A and 5B are a plan view and a side view schematically showing the structures of a planar illumination device according to the fifth embodiment of the present invention.
Figure 5B:
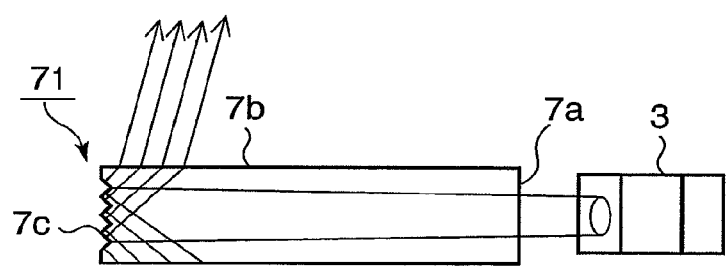

Next, the fifth embodiment of the present invention is described. In the above fourth embodiment, lights polarized and scanned by the rotary polygon mirror are incident on the light guide plate after adjusting the light incident angles by the cylindrical lens so that the lights can be incident at the same incident angle. In contrast, in the present embodiment, reflected lights from the rotary polygon mirror are directly incident on the light guide plate without adjusting the light incident angle. According to the present embodiment, since the cylindrical lens can be omitted, it is possible to reduce an overall size of the planar illumination device. FIGS. 5A and 5B are a plan view and a side view schematically showing the structures of a planar illumination device according to the fifth embodiment of the present invention.

In the planar illumination device according to the present embodiment, the light outputted from the cylindrical lens 2 is polarized and scanned by the rotary polygon mirror 3 on a path in the light guide plate 71 from the light incident surface 7a to another end surface 7c as shown in FIGS. 5A and 5B. Polarized and scanned lights are then reflected by the other end surface 7c such that propagation directions thereof in the light guide plate 71 are aligned. The reflected lights are then deflected to the inside of the light guide plate 71 by the convexo-concave portions of the end surface 7c and re-entered into the light guide plate 71. The lights incident on the light guide plate 71 are deflected by the deflectors while being repeatedly reflected between one principal surface (light output surface) 7b and the other principal surface of the light guide plate 71 and are emitted little by little from the light output surface 7b.

The end surface 7c of the light guide plate 7 light guide plate 71 according to the present embodiment has a lens function of converging or diverging the lights polarized and scanned by the rotary polygon mirror 3 in a direction orthogonal to the thickness-wise direction of the light guide plate 71 and reflects the incident lights while aligning the propagation directions thereof by its lens function. Further, the convexo-concave portions for reflecting lights incident on the light guide plate 71 are formed in the thickness-wise direction of the light guide plate 71. These convexo-concave portions are one example of deflectors, which change the propagation direction of laser light emitted from the light source unit 1 to be incident on the light guide plate 71 using the optical phenomenon of at least one of reflection, scattering, refraction and diffraction.

According to the present embodiment, it is possible to reduce an overall size of the planar illumination device without reducing the thickness, etc., of the light guide plate 71.

Sixth Embodiment

Figure 6A:
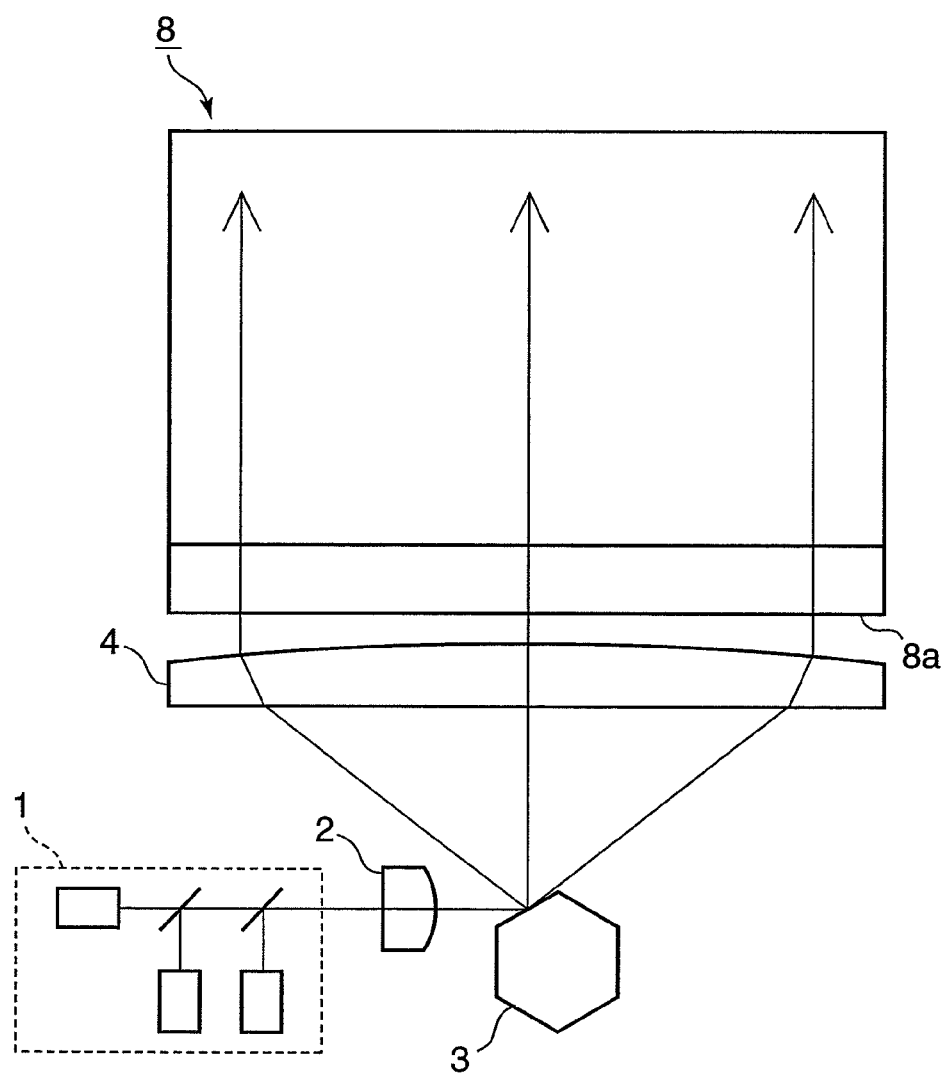
FIGS. 6A and 6B are a plan view and a side view schematically showing the structures of a planar illumination device according to the sixth embodiment of the present invention.
Figure 6B:
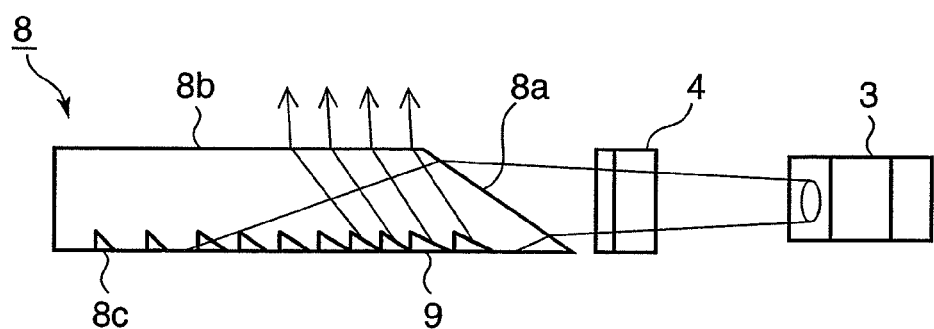

Next, the sixth embodiment of the present invention is described. The present embodiment differs from the above first embodiment in that the light incident surface of the light guide plate is inclined at a Brewster angle with respect to an optical axis of incident light. FIGS. 6A and 6B are a plan view and a side view schematically showing the structures of a planar illumination device according to the sixth embodiment of the present invention. The present embodiment differs from the first embodiment only in a light guide plate 8, and the other elements are not described since being the same as those of the first embodiment.

As shown in FIGS. 6A and 6B, a light incident surface 8a of the light guide plate 8 of the present embodiment is inclined with respect to an light output surface 8b of the light guide plate 8 and this inclination is so set as to form a Brewster angle with respect to an optical axis of incident laser light.

According to the present embodiment, a plurality of projections 9 are formed on the reflecting surface 8c of the light guide plate 8 as in the first embodiment, which deflect light incident on the light guide plate 8 by reflection and direct it toward the light output surface 8b in lines parallel to the light incident surface 8a. The projections 9 are formed over the entire surface of the reflecting surface 8c at different densities, i.e., at higher density in vicinity of the light incident surface 8a than that of other portions as shown in FIG. 6B.

A light source unit 1 of the present embodiment includes laser light sources capable of emitting P-polarized laser lights. In the present embodiment, P-polarized laser lights emitted from the light source unit 1 are incident at a Brewster angle on the light incident surface 8a of the light guide plate 8 to reduce the reflection of the laser lights on the light incident surface 8a.

As described above, according to the planar illumination device of the present embodiment, diffusing light emitted from the light source unit 1 is formed into substantially parallel flux by the cylindrical lens 2. The resulting substantially parallel flux is then polarized and scanned by a rotary polygon mirror 3, and is further polarized by a cylindrical lens 4 so that the light can be incident at the Brewster angle on the light incident surface 8a of the light guide plate 8. With this structure, since the P-polarized light is incident, the light incident on the light guide plate 8 is hardly being reflected by the light incident surface 8a, and is entered into the light guide plate 8.

The light entered into the light guide plate 8 is reflected and deflected by the projections 9 formed the reflecting surface 8c of the light guide plate 8 and is then outputted from the light output surface 8b.

With this structure, the substantially parallel light is incident on the light guide plate 8 an oblique angle with respect to the light output surface 8b, and projections 9 for reflecting therefrom the light toward the light output surface 8b are formed at higher density in vicinity of the light incident surface 8a. Thus, a sufficient luminance can be ensured in vicinity of the light incident surface 8a. In addition, by forming the projections 9 at equal density in areas other than the vicinity of the light incident surface 8a, it is possible to realize uniform luminance of the entire light guide plate 8.

With the structure of the present embodiment, it is possible to improve the efficiency at the light incident surface 8a of the light guide plate 8 in addition to the effect of providing uniform luminance over a large area.

In the foregoing preferred embodiment, the light incident surface 8a of the light guide plate 8 is inclined. However, the present embodiment is not intended to be limited to this structure, and the same effects can be obtained, for example, from the structure wherein the incident angle of light on the light guide plate 8 is inclined.

Furthermore, by inclining both the light incident surface 8a of the light guide plate 8 and the incident angle of incident light, the light guide plate 8 can be made thinner and lighter while maintaining the area of the light incident surface 8a unchanged.

Seventh Embodiment

Figure 7A:
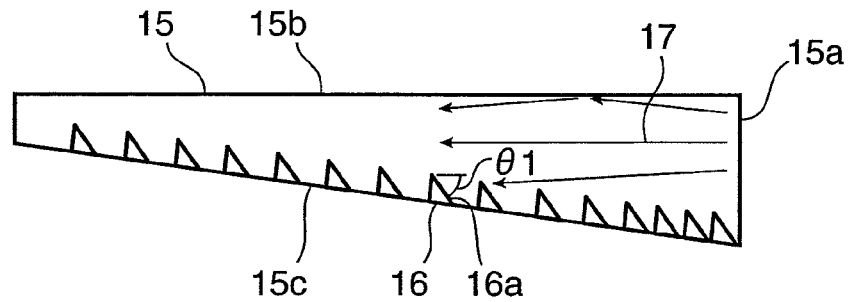
Figure 7B:
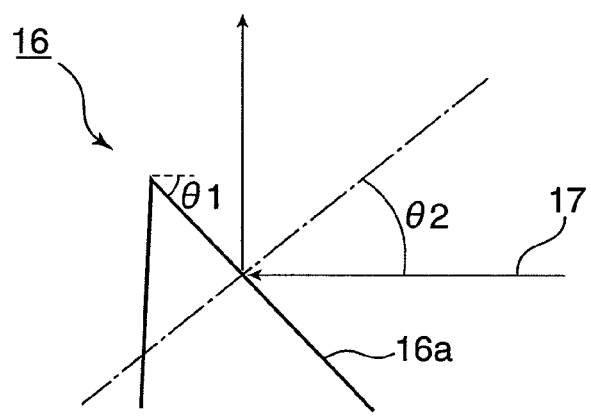
Figure 7C:
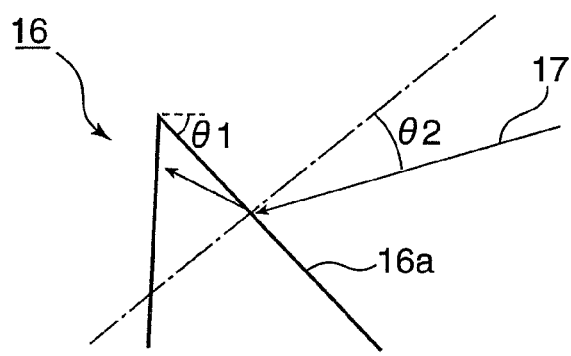

Next, the seventh embodiment of the present invention is described. In the above first to sixth embodiments, the collimator lens is adopted, which forms the diffusing light of the laser light emitted from the light source unit into parallel light, and the laser light is incident on the light guide plate in a direction substantially parallel to the thickness-wise direction of the light guide plate. The present embodiment will explain the specific structure which offers improved light utilization efficiency in the light guide plate by making such substantially parallel laser light is incident. FIGS. 7A to 7C are diagrams schematically showing the light guide plate used in the planar illumination device according to the seventh embodiment of the present invention, wherein FIG. 7A is a side view schematically showing the structure of the light guide plate, FIG. 7B is a diagram showing a projection formed on a reflecting surface of the light guide plate and an incident angle of laser light incident on the projection, and FIG. 7C is a diagram showing the projection formed on the reflecting surface of the light guide plate and another incident angle of laser light incident on the projection.

As shown in FIG. 7A, a light guide plate 15 of the present embodiment has a light incident surface 15a as one end surface, an light output surface 15b as one principal surface, a reflecting surface 15c as the other principal surface and projections 16 formed on the reflecting surface 15c. Laser light 17 substantially parallel to the thickness-wise direction of the light guide plate 15, i.e., substantially parallel to the light output surface 15b of the light guide plate 15 is incident on the light guide plate 15 through the light incident surface 15a, and such light incident through the light incident surface 15a is deflected toward the light output surface 15b by the reflection from the projections 16 arranged on the reflecting surface 15c of the light guide plate 15. The deflected light is then outputted from the light output surface 15b at or smaller angle than the critical angle of the light guide plate 15.

As shown in FIG. 7A, the projections 16 of the present embodiment are formed by forming grooves in the reflecting surface 15c of the light guide plate 15, and the reflecting surface 16a of each projection 16 is formed at a predetermined angle θ1 with respect to the light output surface 15b of the light guide plate 15. Since the projections 16 are formed by forming the grooves in the light guide plate 15, the reflecting surfaces 16a of the projections 16 have the same critical angle as the light guide plate 15. Namely, when the laser light 17 is incident on the reflecting surface 16a at or smaller angle than the critical angle, the reflecting surface 16a transmits the laser light 17 (FIG. 7C). On the other hand, when the laser light 17 is incident on the reflecting surface 16a at an angle larger than the critical angle, the reflecting surface 16a totally reflects the laser light 17(FIG. 7B).

As shown in FIGS. 7B and 7C, the laser light 17 is incident on the reflecting surface 16a of the projection 16 at a predetermined angle (incident angle) θ2 with respect to the normal (dashed-dotted line in FIGS. 7B and 7C) of the reflecting surface 16a. The following explanations will be given through the case of adopting the light guide plate 15 made of acrylic resin.

In the case of the acrylic light guide plate 15, a refractive index of acrylic is around 1.49 and a critical angle thereof is around 42°. Accordingly, total reflection on the reflecting surface 16a is realized by arranging so that the laser light 17 is incident on the reflecting surface 16a of the projection 16 at or larger angle than the critical angle. Thus, in the present embodiment, the angle θ1 formed between the reflecting surface 16a and the light output surface 15b of the light guide plate 15 is set to around 45°. With this structure, the laser light 17 incident on the light guide plate 15 in a direction substantially parallel to the light output surface 15b of the light guide plate 15 is incident on the reflecting surface 16a of the projection 16 at an angle θ2 equal to or larger angle than the critical angle as shown in FIG. 7B. An angle formed between the incident laser light 17 incident on the light guide plate 15 and the light output surface 15b is preferably set to or smaller than ±3°. With this structure, all the fluxes of the laser light 17 are deflected by the total reflection of the reflecting surfaces 16a of the projections 16, and the deflected fluxes are outputted from the light output surface 15b. As a result, it is possible to realize a still improved light utilization efficiency of the light guide plate 15.

Further, since light is outputted from the light guide plate 15 in substantially vertical direction, it is not necessary to provide a prism sheet for adjusting a viewing angle by collecting the luminance on the front surface, and a diffusion sheet is necessary for increasing the viewing angle instead. However, according to the present embodiment, multiple reflections between the diffusion sheet and the light guide plate 15 are not necessary unlike the case of adopting the prism sheet, and the structure adopting only the diffusion sheet is advantageous in view of efficiency.

Incidentally, by further arranging the foregoing structure of the present embodiment such that the reflecting surface 15c of the light guide plate 15 is inclined, it is possible to reduce an amount of light leaking from the end surface facing the light incident surface 15a. This structure is advantageous in terms of light utilization efficiency.

Furthermore, by arranging the foregoing structure of the present embodiment such that the reflecting surfaces 16a of the projections 16 and the light output surface 15b forms an angle of around 40°, improved utilization efficiency of light can be realized even if variations in angle formed between the laser light 17 incident on the light guide plate 15 and the light output surface 15b exist in a range of around ±8°.

Eighth Embodiment

Figure 8:
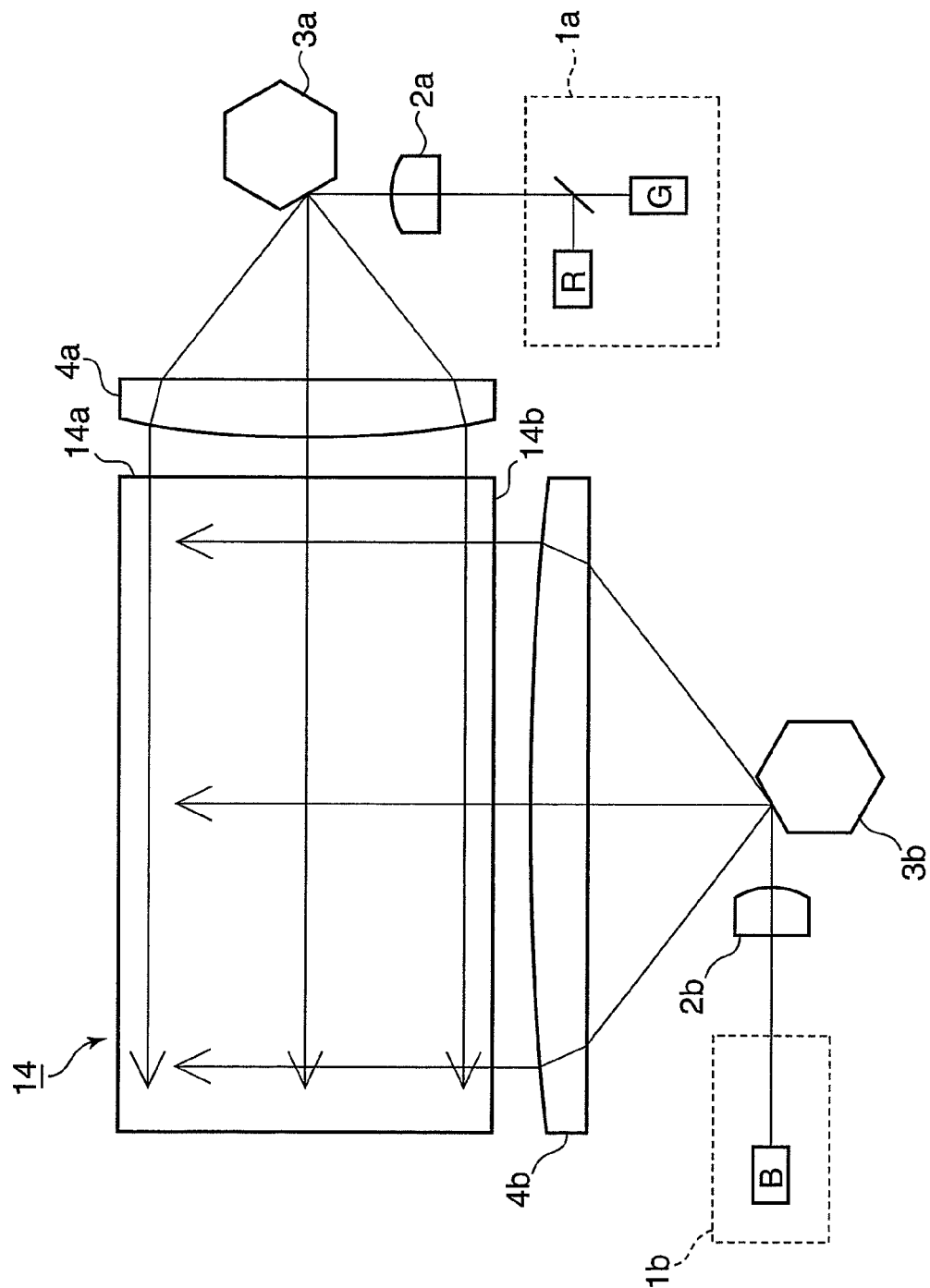
FIG. 8 is a plan view schematically showing the structure of a planar illumination device according to the eighth embodiment of the present invention.

Next, the eighth embodiment of the present invention is described. In the above first to seventh embodiments, a single light source unit is adopted wherein the three laser light sources for emitting lights of three primary colors, i.e. red, green and blue lights are incorporated, and lights respectively emitted from the three laser light sources are incident on the same incident surface of the light guide plate. In contrast, the present embodiment adopts a plurality of light source units for laser lights of respective colors, and the laser lights in respective colors emitted from the light source units are incident on different incident surfaces of a light guide plate. FIG. 8 is a plan view schematically showing the structure of a planar illumination device according to the eighth embodiment of the present invention.

The planar illumination device according to the present embodiment is, as shown in FIG. 8, provided with a light source unit 1a for combining red and green lights emitted from two laser light sources to be outputted, a collimating lens 2a which forms the light emitted from the light source unit 1a into a substantially parallel light, a rotary polygon mirror 3a which polarizes and scans the light emitted from the light source unit 1a, a cylindrical lens 4a arranged so as to form a focal point on a reflecting surface of the rotary polygon mirror 3a, and a light guide plate 14 with a light incident surface (one end surface) 14a of the light entered from the cylindrical lens 4a and a light output surface (one principal surface), a light source unit 1b for outputting blue light emitted from a laser light source, a collimating lens 2b which forms the light emitted from the light source unit 1b into a substantially parallel light, a rotary polygon mirror 3b which polarizes and scans the light emitted from the light source unit 1b, a cylindrical lens 4b arranged so as to form a focal point on a reflecting surface of the rotary polygon mirror 3b. The light emitted from the cylindrical lens 4b is incident through another incident surface 14b of the light guide plate 14. It is needless to mention that the present embodiment is not intended to be limited to the foregoing structure wherein the light source unit 1a emits red and green lights and the light source unit 1b emits blue light, and other structures may be adopted.

On the light incident surfaces 14a, 14b of the light guide plate 14 in accordance with the present embodiment, reflective scattering elements are uniformly formed, which deflect, for example, both incident lights by scattering and which direct them to the light output surface over the entire reflecting surfaces of the light guide plate 14, and a translucent film having a wavelength selection property is formed on the light output surface of the light guide plate.

The translucent film with the foregoing wavelength selection property may be arranged, for example, to have such a transmittance distribution with respect to only blue light as in the case of the third embodiment, and this transmittance distribution may be set so as to have higher transmittance to the light incident surface and lower transmittance to the other end surface.

On the other hand, convexo-concave portions for diffracting, refracting or scattering light incident on the light guide plate 14 in a thickness-wise direction of the light guide plate 14 are, for example, formed on the light incident surface 14a of the light guide plate 14 as in the case of the fourth embodiment. Thus, the luminances of lights emitted from the light output surface can be separately and independently adjusted according to the characteristics of the respective laser lights incident through the light incident surfaces 14a and 14b. Therefore, according to the present embodiment, the luminance can be made more uniform when the laser lights of the respective colors are emitted from the light guide plate 14.

As described above, according to the planar illumination devices of the first to eighth embodiments of the present invention and the liquid crystal display devices adopting the same, wide color reproducibility, thin and large screens and low power consumption can be realized by using laser light sources with high color purity and high luminous efficiency. Simultaneously, luminance can be made uniform over a large area and the large effect of higher image quality can be obtained.

The present invention is summarized as follows from the foregoing embodiments. Specifically, a planar illumination device according to the present invention includes a laser light source; a light guide plate for guiding light entered through an end surface to be outputted from a first principal surface; an optical element which forms diffusing light outputted from the laser light source into a substantially parallel light in a thickness-wise direction of the light guide plate and which outputs the resulting parallel light to the end surface of the light guide plate; and a first light deflecting unit for deflecting a propagation direction in the light guide plate of the light incident thereon, wherein the first light deflecting unit is arranged such that a degree of deflection of the light incident on the light guide plate differs according to positions in the light guide plate, to make an amount of light outputted from the first principal surface uniform in the first principal surface.

According to the foregoing structure of the planar illumination device wherein the first light deflecting unit is arranged such that a degree of deflection of the light incident on the light guide plate differs according to positions in the light guide plate, the amount of light entered through the first principal surface of the light guide plate can be made uniform in the first principal surface. Therefore, a planar illumination device having a uniform luminance over a large area can be realized.

It is preferable that the substantially parallel light outputted from the optical element is incident on the light guide plate; the first light deflecting unit includes a plurality of deflectors provided in the light guide plate, for deflecting the substantially parallel light using an optical phenomenon of at least one of reflection, scattering, refraction and diffraction; and the plurality of deflectors are provided at different densities according to positions in the light guide plate so as to have different degrees of deflection according to the positions.

With this structure, the degree of deflection of the substantially parallel light in the light guide plate can be accurately changed since the degree of deflection of the substantially parallel light can be changed according to the density distribution of the plurality of deflectors.

It is preferable that the plurality of deflectors are reflective scattering elements arranged on the first principal surface of the light guide plate or a second principal surface thereof facing the first principal surface; and the plurality of reflective scattering elements are provided at higher density in vicinity of the end surface of the light guide plate than that of other portions.

With the foregoing structure, the frequency of deflecting the substantially parallel light can be changed with ease by arranging the plurality of reflective scattering elements on the first or second principal surface.

It is preferable that the plurality of deflectors are convexo-concave portions formed on the first principal surface of the light guide plate or on a second principal surface thereof facing the first principal surface; and the convexo-concave portions are formed at higher density in vicinity of the light incident end surface of the light guide plate than that of other portions.

With the foregoing structure, the frequency of deflecting the substantially parallel light can be changed with ease by forming the plurality of convexo-concave portions on the first or second principal surface.

It is preferable that the plurality of deflectors are scattering elements dispersed in the light guide plate; and the plurality of scattering elements are formed at higher density in vicinity of the light incident end surface of the light guide plate than that of other portions.

With the foregoing structure, the frequency of deflecting the substantially parallel light can be changed with ease by dispersing the scattering elements in the light guide plate.

It is preferable that a translucent film is further formed on the first principal surface of the light guide plate for transmitting the light entered through the first principal surface, wherein the transmittance of the translucent film is higher in vicinity of the end surface of the light guide plate than that of other portions thereof.

With the foregoing structure, a luminance distribution in the first principal surface can be made more uniform since the transmittance of the translucent film is higher in vicinity of the end surface of the light guide plate than that of other portions thereof to increase the amount of light emitted from the vicinity of the end surface of the light guide plate.

It is preferable that an optical lens is further provided between the optical element and the light guide plate, which forms the substantially parallel light outputted from the optical element into a substantially parallel light in a direction orthogonal to the thickness-wise direction of the light guide plate, wherein the plurality of deflectors are arranged along a plurality of straight lines vertical to the substantially parallel light incident on the light guide plate.

With the foregoing structure, the light incident on the light guide plate from the optical lens is outputted from the first principal surface while the polarization thereof is maintained. Therefore, in an application wherein a liquid crystal display panel is irradiated with the light emitted from the first principal surface, it is possible to improve the transmittance of the liquid crystal display panel.

It is preferable that the substantially parallel light outputted from the optical element is incident on the light guide plate in a radial fashion; and the plurality of deflectors are arranged in parabolas convex in an incident direction of the substantially parallel light incident on the light guide plate in the radial fashion.

With the foregoing structure, the polarization direction of the substantially parallel light incident on the light guide plate can be aligned by the plurality of deflectors, and transmittance of a liquid crystal display panel can be improved while realizing a reduction in size of the optical system in an application wherein the liquid crystal display panel is irradiated with light emitted from the first principal surface.

It is preferable that the light guide plate includes a reflecting surface facing the end surface of the light guide plate, which reflects the substantially parallel light incident through the end surface toward the light incident end surface of the light guide plate, and which forms the light reflected therefrom to the end surface into a substantially parallel light in a direction orthogonal to the thickness-wise direction of the light guide plate; and the plurality of deflectors are formed at higher density in vicinity of the reflecting surface of the light guide plate than that of other portions.

With the foregoing structure, the polarization direction of the light incident on the light guide plate can be aligned in the light guide plate. Therefore, it is possible to reduce the size of the optical system for outputting a light to be incident on the light guide plate.

It is preferable that the light guide plate includes a second light deflecting unit provided on the end surface, which deflects light incident on the light guide plate in the thickness-wise direction of the light guide plate using an optical phenomenon of at least one of reflection, scattering, refraction and diffraction; and the second light deflecting unit includes a plurality of convexo-concave portions.

With the foregoing structure, a degree of deflection of the light incident on the light guide plate can be efficiently changed by forming the plurality of convexo-concave portions on the end surface of the light guide plate.

It is preferable that the plurality of convexo-concave portions form the light incident on the light guide plate into a substantially parallel light in a direction orthogonal to the thickness-wise direction of the light guide plate.

With the foregoing structure, the amount of light propagating in a direction toward the first principal surface in vicinity of the end surface of the light guide plate can be efficiently increased.

It is preferable that the plurality of convexo-concave portions have a sawtooth shape with an inclined surface forming a Brewster angle with respect to the substantially parallel light emitted form the optical element.

With the foregoing structure, the light can be efficiently incident on the light guide plate without being reflected, wherefore light utilization efficiency is improved.

It is preferable that a third light deflecting unit is further provided on an optical path between the optical element and the light guide plate, which deflects the light incident on the light guide plate in the thickness-wise direction of the light guide plate using an optical phenomenon of at least one of reflection, scattering, refraction and diffraction; and the third light deflecting unit has a lens effect of collecting light toward the end surface of the light guide plate.

With the foregoing structure, the amount of light propagating in a direction toward the first principal surface in vicinity of the end surface of the light guide plate can be efficiently increased since the light is deflected to vicinity of the end surface of the light guide plate.

It is preferable that the light guide plate includes a reflecting surface facing the end surface of the light guide plate, which reflects the substantially parallel light incident through the end surface toward the end surface of the light guide plate, and which forms the light reflected therefrom to the light incident end surface into a substantially parallel light in a direction orthogonal to the thickness-wise direction of the light guide plate; and the first light deflecting unit includes a plurality of convexo-concave portions formed on the reflecting surface of the light guide plate, which deflect the incident direction of the light incident on the light guide plate in the thickness-wise direction of the light guide plate using an optical phenomenon of at least one of reflection, scattering, refraction and diffraction.

With the foregoing structure, the polarization direction of the light incident on the light guide plate can be aligned in the light guide plate. It is therefore possible to reduce the size of the optical system for outputting the light to be incident on the light guide plate.

It is preferable that the substantially parallel light outputted from the optical element is incident on the light guide plate in a direction inclined with respect to the first principal surface of the light guide plate.

With the foregoing structure, the light can be efficiently incident into the light guide plate while suppressing the reflection of the incident light on the light guide plate.

It is preferable that the end surface of the light guide plate is inclined with respect to the first principal surface of the light guide plate.

With the foregoing structure, the light can be efficiently incident into the light guide plate while suppressing the reflection of the incident light on the light guide plate.

It is preferable that the end surface of the light guide plate forms a Brewster angle with respect to an incident direction of the substantially parallel light incident through the end surface of the light guide plate.

With the foregoing structure, the light can be efficiently incident into the light guide plate without being reflected. As a result, it is possible to still improve the light utilization efficiency.

It is preferable that the substantially parallel light outputted from the optical element is incident in a direction substantially parallel to the first principal surface of the light guide plate.

With the foregoing structure, the light incident on the light guide plate can be efficiently emitted from the first principal surface.

It is preferable that the convexo-concave portions respectively have inclined surfaces which totally reflect the substantially parallel light.

With the foregoing structure, the light utilization efficiency can be further improved by reducing the light transmitting through the plurality of convexo-concave portions.

A liquid crystal display device according to the present invention includes a liquid crystal display panel and the planar illumination device of any of the foregoing structures, for illuminating the liquid crystal display panel.

With the foregoing structure of the above liquid crystal display device, the liquid crystal display panel can be irradiated with light having a uniform luminance from the planar illumination device, a quality image of a large area can be displayed.

INDUSTRIAL APPLICABILITY

According to the planar illumination device and the liquid crystal display device of the present invention, a planar illumination device having a uniform luminance in a surface can be realized by conforming the structure of a light guide plate to the case of using a laser light source in an edge light type planar illumination device suitable for a thin structure, and a liquid crystal display device having a high image quality and a thin and large screen can be realized using this planar illumination device. Therefore, the present invention is useful in the field of display.

What is claimed is:

1. A planar illumination device, comprising:
    a laser light source for emitting a laser light;
    a light guide plate including a light incident end surface and a first principal surface, for guiding the laser light having entered through the light incident end surface to be outputted from the first principal surface;
    an optical element which forms the laser light into a substantially parallel light in a thickness-wise direction of the light guide plate;
    a light diffusing unit which diffuses the laser light in a direction orthogonal to the thickness-wise direction of the light guide plate; and
    a light deflecting unit which deflects the laser light having passed through the optical element and the light diffusing element in the thickness-wise direction of the light guide plate,
    wherein the light deflecting unit deflects the laser light in the thickness-wise direction of the light guide plate, after the laser light is shaped in a direction of the light incident end surface of the light guide plate by the optical element and the diffusing element,
    wherein the light deflecting unit includes a plurality of deflectors arranged on the first principal surface of the light guide plate or a second principal surface of the light guide plate facing the first principal surface,
    wherein the plurality of deflectors deflects the laser light incident on the light guide plate in the thickness-wise direction of the light guide plate using an optical phenomenon of at least one of reflection, scattering, refraction and diffraction, and
    wherein a density of deflectors of the plurality of deflectors is higher in a vicinity of the light incident end surface of the light guide plate than in other portions of the light guide plate.

2. The planar illumination device according to claim 1, wherein the light deflecting unit includes a cylindrical lens (i) having a curvature in the thickness-wise direction of the light guide plate, (ii) provided in a vicinity of a light incident end surface side of the light guide plate, and (iii) which deflects the light incident on the light guide plate in the thickness-wise direction of the light guide plate.

3. The planar illumination device according to claim 1, wherein the plurality of deflectors includes reflective scattering elements.

4. The planar illumination device according to claim 1, wherein the light incident end surface of the light guide plate is inclined with respect to the first principal surface of the light guide plate.

5. A liquid crystal display device, comprising:
    a liquid crystal display panel; and
    the planar illumination device of claim 1 for illuminating the liquid crystal display panel.

6. The planar illumination device according to claim 1, wherein the laser light is incident onto the light guide plate in a direction inclined with respect to the first principal surface of the light guide plate.

7. The planar illumination device according to claim 6, wherein the light incident end surface of the light guide plate forms a Brewster angle with respect to an incident direction of the laser light incident on the light incident end surface of the light guide plate.

8. The planar illumination device according to claim 1, wherein the plurality of deflectors includes convexo-concave portions.

9. The planar illumination device according to claim 8, further comprising an optical lens provided between the light diffusing unit and the light guide plate, for forming the laser light outputted from the light diffusing unit into a substantially parallel light in the direction orthogonal to the thickness-wise direction of the light guide plate, wherein
    the plurality of deflectors is provided along a plurality of straight lines vertical to the substantially parallel light.

10. The planar illumination device according to claim 8, wherein:
    the substantially parallel light outputted from the optical element is incident on the light guide plate in a radial fashion; and the plurality of deflectors is arranged in parabolas convex in an incident direction of the laser light incident on the light guide plate in the radial fashion.

11. A planar illumination device, comprising:
a laser light source for emitting a laser light;
a light guide plate including a light incident end surface and a first principal surface, for guiding the laser light having entered through the light incident end surface to be outputted from the first principal surface;
an optical element which forms the laser light into a substantially parallel light in a thickness-wise direction of the light guide plate; and
a light diffusing unit which diffuses the laser light in a direction orthogonal to the thickness-wise direction of the light guide plate,
wherein the light guide plate includes a reflecting surface (i) facing the light incident end surface of the light guide plate, (ii) which reflects the substantially parallel light which is incident through the light incident end surface, and (iii) which forms the light reflected therefrom into a substantially parallel light in the direction orthogonal to the thickness-wise direction of the light guide plate,
wherein a light deflecting unit (i) is provided in a vicinity of the reflecting surface, and (ii) is for diffusing, in the light guide plate, the laser light substantially parallel to the thickness-wise direction of the light guide plate in the thickness-wise direction,
wherein the light deflecting unit includes a plurality of deflectors arranged on the first principal surface of the light guide plate or a second principal surface of the light guide plate facing the first principal surface,
wherein the plurality of deflectors deflects the laser light incident on the light guide plate in the thickness-wise direction of the light guide plate using an optical phenomenon of at least one of the reflection, scattering, refraction and diffraction,
wherein a density of deflectors of the plurality of deflectors is higher in a vicinity of the reflecting surface of the light guide plate than in other portions of the light guide plate, and
wherein the reflecting surface reflects the substantially parallel light toward one of the first principal surface and the second principal surface on which the plurality of deflectors are arranged.

12. The planar illumination device according to claim 11, wherein the laser light is incident on the light guide plate in a direction inclined with respect to the first principal surface of the light guide plate.

13. A planar illumination device comprising:
a laser light source for emitting a laser light;
a light guide plate including a light incident end surface and a first principal surface, for guiding the laser light having entered through the light incident end surface to be outputted from the first principal surface;
an optical element which forms the laser light into a substantially parallel light in a thickness-wise direction of the light guide plate;
a light diffusing unit which diffuses the laser light in a direction orthogonal to the thickness-wise direction of the light guide plate; and
a light deflecting unit which deflects the laser light having passed through the optical element and the light diffusing element in the thickness-wise direction of the light guide plate,
wherein the light deflecting unit deflects the laser light in the thickness-wise direction of the light guide plate, after the laser light is shaped in a direction of the light incident end surface of the light guide plate by the optical element and the diffusing element,
wherein the light deflecting unit includes a plurality of convexo-concave portions formed on the light incident end surface of the light guide plate, and
wherein the plurality of convexo-concave portions deflects the laser light incident on the light guide plate in the thickness-wise direction of the light guide plate.

14. The planar illumination device according to claim 13, wherein the plurality of convexo-concave portions forms the laser light incident on the light guide plate into a substantially parallel beam in the direction orthogonal to the thickness-wise direction of the light guide plate.

15. The planar illumination device according to claim 13, wherein each convexo-concave portion of the plurality of convexo-concave portions has a sawtooth shape with an inclined surface forming a Brewster angle with respect to the substantially parallel light outputted from the optical element.

16. A planar illumination device comprising:
a laser light source for emitting a laser light;
a light guide plate including a light incident end surface and a first principal surface, for guiding the laser light having entered through the light incident end surface to be outputted from the first principal surface;
an optical element which forms the laser light into a substantially parallel light in a thickness-wise direction of the light guide plate;
a light diffusing unit which diffuses the laser light in a direction orthogonal to the thickness-wise direction of the light guide plate; and
a light deflecting unit which deflects the laser light having passed through the optical element and the light diffusing element in the thickness-wise direction of the light guide plate,
wherein the light deflecting unit deflects the laser light in the thickness-wise direction of the light guide plate, after the laser light is shaped in a direction of the light incident end surface of the light guide plate by the optical element and the diffusing element,
wherein the light deflecting unit includes a plurality of scattering elements, wherein a density of scattering elements of the plurality of scattering elements is higher in a vicinity of the light incident end surface of the light guide plate than in other portions of the light guide plate, and
wherein the plurality of scattering elements deflects the laser light incident on the light guide plate in the thickness-wise direction of the light guide plate.

17. A planar illumination device comprising:
a laser light source for emitting a laser light;
a light guide plate including a light incident end surface and a first principal surface, for guiding the laser light having entered through the light incident end surface to be outputted from the first principal surface;
an optical element which forms the laser light into a substantially parallel light in a thickness-wise direction of the light guide plate;
a light diffusing unit which diffuses the laser light in a direction orthogonal to the thickness-wise direction of the light guide plate;
a light deflecting unit which deflects the laser light having passed through the optical element and the light diffusing element in the thickness-wise direction of the light guide plate; and a translucent film formed on the first principal surface of the light guide plate for transmitting the laser light having entered through the light incident end surface through the first principal surface, wherein the light deflecting unit deflects the laser light in the thickness-wise direction of the light guide plate, after the laser light is shaped in a direction of the light incident end surface of the light guide plate by the optical element and the diffusing element, and wherein a transmittance of the translucent film is high in a vicinity of the light incident end surface of the light guide plate, and the transmittance of the translucent film is lower toward another end surface of the light guide plate facing the light incident end surface.

18. A planar illumination device comprising:

a laser light source for emitting a laser light;

a light guide plate including a light incident end surface and a first principal surface, for guiding the laser light having entered through the light incident end surface to be outputted from the first principal surface;

an optical element which forms the laser light into a substantially parallel light in a thickness-wise direction of the light guide plate; and a light diffusing unit which diffuses the laser light in a direction orthogonal to the thickness-wise direction of the light guide plate, wherein the light guide plate includes a reflecting surface (i) facing the light incident end surface of the light guide plate, (ii) which reflects the substantially parallel light which is incident through the light incident end surface, and (iii) which forms the light reflected therefrom into a substantially parallel light in the direction orthogonal to the thickness-wise direction of the light guide plate, wherein a light deflecting unit (i) is provided in a vicinity of the reflecting surface, and (ii) is for diffusing, in the light guide plate, the laser light substantially parallel to the thickness-wise direction of the light guide plate in the thickness-wise direction, wherein the light deflecting unit includes a plurality of convexo-concave portions formed on the reflecting surface of the light guide plate, and wherein the plurality of convexo-concave portions deflects the laser light having entered through the light incident end surface of the light guide plate in the thickness-wise direction of the light guide plate.

* * * * *